Jan. 9, 1962 G. J. LALONDE 3,016,508

PRINTED CIRCUIT ELECTRICAL CONNECTORS

Filed Oct. 24, 1960

INVENTOR.
GUY J. LALONDE
BY Albert F. Kronman
ATTORNEY

1

3,016,508

PRINTED CIRCUIT ELECTRICAL CONNECTORS

Guy J. Lalonde, Whitestone, N.Y., assignor to Precision Connectors, Inc., Jamaica, N.Y., a corporation of New York Filed Oct. 24, 1960, Ser. No. 64,579
5 Claims. (Cl. 339—17)

This invention relates to electrical connectors and particularly such as are capable of making electrical connections with a dielectric card or board having printed circuits on one or both sides thereof.

Where connections are to be made to flat cards or boards having printed circuits thereon it is essential that a large number of contacts be provided each of which will be in firm contact with the conductive area on the card or board adjacent thereto. However, variations in board thickness, alignment or angular disposition often interfere with the quality of the electrical connection on presently known devices.

Accordingly, it is an object of the present invention to provide an electrical connector which will firmly grip a printed circuit card or board to provide a highly satisfactory electrical connection.

Another objection of the present invention is to provide an electrical connector which will not be affected by maximum board tolerance variations in thickness.

A further object of the present invention is to provide an electrical connector which will maintain a uniform pressure over the full length of the contacting surfaces.

An object of the present invention is to provide a connector structure which will not score or damage printed circuit boards despite repeated connecting and disconnecting operations.

Still another object of the present invention is to provide an electrical connector structure which will not disconnect in the presence of vibration or board displacement.

A feature of the present invention is its back spring structure which assures a strong wiping contact of the connecting surfaces.

Another feature of the present invention is its use of a helper-spring to maintain uniform pressure on the contacting surfaces.

A further feature of the present invention is its use of a coined wiper-spring which provides flat contacting surfaces improving the contact between the electrical elements.

Still another feature of the present invention is its unitary construction for improving the strength and useful life of the connector assembly.

The invention consists of the construction, combination and arrangement of parts, as herein illustrated, described and claimed.

In the accompanying drawing, forming a part hereof is illustrated one form of embodiment of the invention, and in which.

Figures 1, 2, 3, 4, 5, 6:
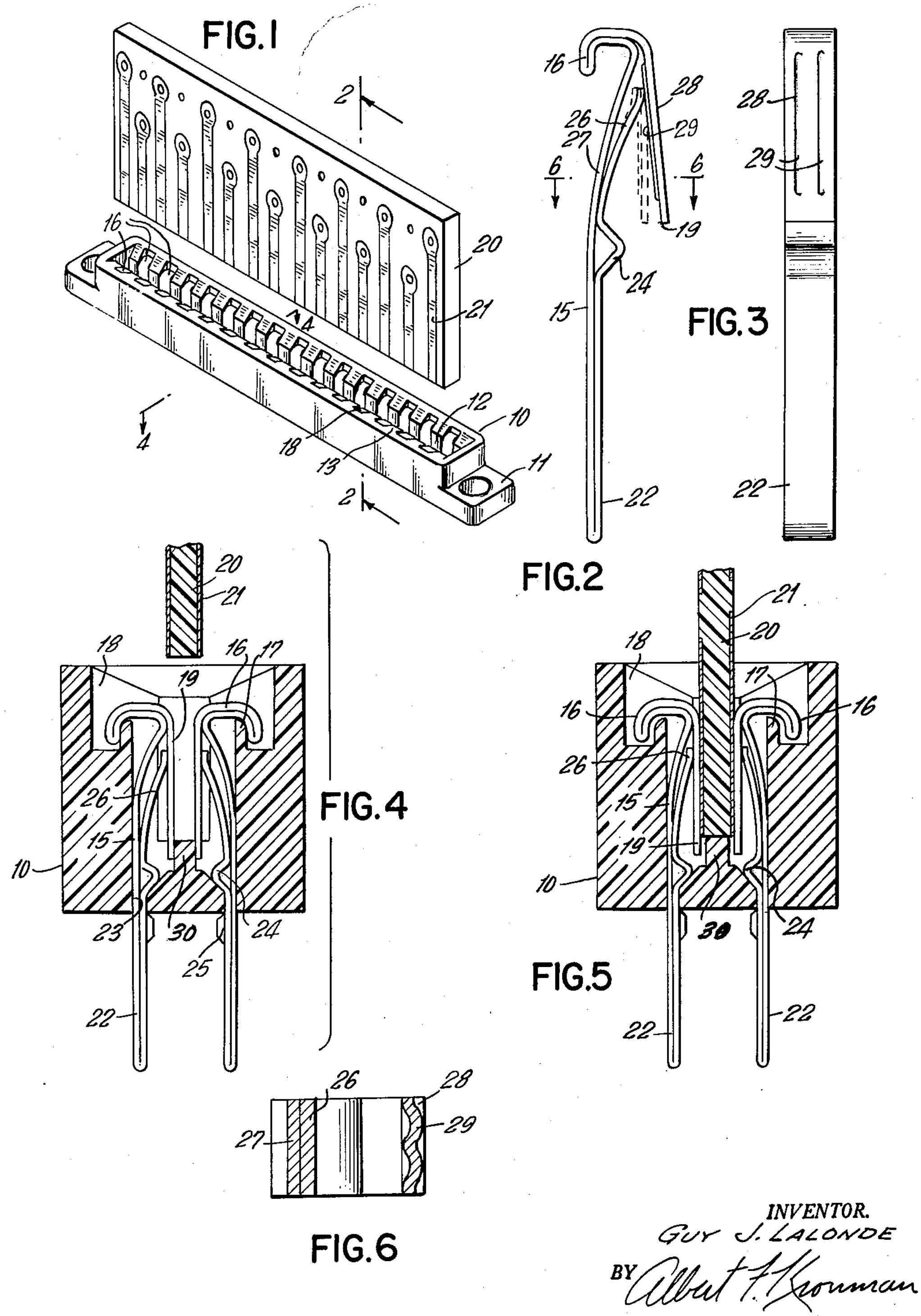
FIGURE 1 is a somewhat isometric view of a complete embodiment of the present invention.
FIGURE 2 is a view in side elevation of an electrical connector made in accordance with the present invention.
FIGURE 3 is a view in front elevation of the connector shown in FIGURE 2.
FIGURE 4 is a cross-sectional view taken on line 4—4 in FIGURE 1, looking in the direction of the arrows.
FIGURE 5 is a view somewhat similar to FIGURE 4 showing the position of the contact elements with the printed circuit board in place.
FIGURE 6 is a cross-sectional view taken on line 6—6 of FIGURE 2, looking in the direction of the arrows.

Referring to the drawings, and specifically to FIGURE

2

1, 10 indicates an elongated dielectric block having securing tabs 11, at each end thereof. The block 10 is provided with an elongated slot 12 which is axially disposed within the said block. A plurality of compartment defining walls 13 extend inwardly from each side of the slot 12 in the direction of the center thereof. The walls 13 are spaced from each other as indicated at 14, to receive therein a contact member 15.

The contact member, best shown in FIGURES 2–5, consists of a single length of conductive material, such as spring temper Phosphor bronze, or beryllium copper, doubled back upon itself at each end and bent into the configuration shown in FIGURE 2. The upper end of the contact member 15 which is doubled back upon itself is shaped into a somewhat hooked-like member 16, which member overlies a longitudinal rib 17 in the dielectric block 10 as best shown in FIGURES 4 and 5. The hook-like portion 16 serves to limit the travel of the contact member 15 within the compartment 18 formed by the spaced walls 13.

The free end 19 of the upper portion of the contact member 15 is bent downwardly from the hook-like part 16, in the direction of the center of the dielectric block 10. This free end of the contact hereinafter referred to as the wiper-spring 19 is the portion of the contact which makes the connection with the printed circuit board 20. As shown in FIGURES 1, 4 and 5, the printed circuit board 20 is provided with a plurality of conductive paths 21 which slip between opposed contact members 15 and are placed in electrical contact therewith. The lower portion of the contact 15 is doubled back upon itself to form an elongated terminal 22. The terminal 22 is slipped through an opening 23 formed in the bottom of each of the compartments 18 of the dielectric block 10.

The terminal portion 22 is offset in the direction of the center of the block as indicated at 24 to form a lock which holds the contact member 15 within the dielectric block 10. A small ear 25 is also struck from the terminal member 22 and together with the offset portion 24, secures the contact 15 by bearing against the top and bottom of the opening 23 in the dielectric block 10. The free lower end of the contact member 15 extends upwardly from the opening 23 and is bent inwardly in the direction of the center of the dielectric block and brought to bear against the back of the wiper-spring 19. This free end of the contact 15 is hereinafter designed as the helper-spring 26. The helper-spring 26 serves to urge the wiper-spring 19 toward the printed circuit board 20, and thereby substantially improve the strength of the contact between the conductive path 21 on the printed circuit board 20 and the wiper-spring 19 of the contact 15.

It will be noted that the body of the contact 15 immediately below the hook-like portion 16 is bowed as indicated at 27 to provide a further spring action hereinafter referred to as the back-spring. The back-spring in bearing against the sides of the elongated slot 12 further forces the wiper-spring 19 in the direction of the printed circuit board 20.

The contacting surface 28 of the wiper-spring 19 may be coined or provided with ribs 29 as shown in FIGURES 2 and 3 to stiffen the spring 19 and thereby improve the electrical contact between the wiper-spring 19 and the conductive path 21 of the printed circuit board 20.

Referring to FIGURES 4 and 5, the operation of the contact assembly will become apparent. With the contact members 15 in place within the dielectric block the wiper-springs 19 on either side of the elongated slot 12, will be forced toward the center of the said slot and will come to bear against a small ridge 30 molded into the bottom of the slot 12. At this juncture it will be noted that the two wiper-springs 19 are parallel to one another and define a space smaller than the thickness of the printed circuit board 20. As the board 20 is inserted into the slot 12 it forces the contact members 15 apart as shown in FIGURE 5. The hook-like members 16 are forced away from the ribs 17 and the wiper-springs 19 are separated by the board 20.

The separation of the wiper-springs 19 is accomplished against the resistance of the back-spring 27, the helper-spring 26 and the wiper-springs 19. As a result, a very firm wiping contact is made between the conductive paths 21 and the wiper-springs 19. It will be observed from an examination of FIGURE 5 that the wiper-springs 19 maintain their parallel alignment after the insertion of the printed circuit board and that they are in contact with the said board for substantially their entire length. The construction of the contact members 15 is such that they can compensate for irregularity or differences in thickness in the printed circuit board 20 within the maximum board tolerance variation. In addition, the large wiping contact surface of the wiper-springs 19, distribute the pressure of the contacts 15 over a large area thereby minimizing damage to the conductive paths 21 of the printed circuit board 20. The individual contact springs in the compartments 18 can also compensate for warpage in the printed circuit board 20 or for angular misalignment of the said board. The contacts 15 in effect follow the printed circuit board 20 and thereby eliminate discontinuity caused by vibration or motion of the printed circuit board.

The bowed back-spring 27 operates to insure a contact wiping pressure immediately upon the insertion of the board 20 by reason of the fact that it operates at the top of the contact member 15.

Having thus fully described the invention, what is claimed as new and desired to be secured by Letters Patent of the United States is:

1. An electrical connector for a printed circuit board comprising an elongated dielectric block, an elongated slot in the top of said block disposed along the longitudinal axis thereof, a plurality of spaced compartment defining walls in the slot extending from each side thereof in the direction of the center of said slot, an opening in the block leading from each of the compartments to the bottom of said block, a contact member in each of the compartments extending downwardly through the openings and out of the bottom of the block, each of said contacts comprising a single length of conductive material doubled back upon itself at each end thereof, a somewhat hook shaped member formed in the doubled back portion at the top of the contact and extending into the compartment, a contact wiper spring formed of the free end of the upper portion of the contact disposed in the slot and extending in the direction of the center thereof, an elongated terminal member formed of the doubled back bottom portion of the conductive material, and an upwardly disposed helper spring consisting of the free end of the bottom portion of the length of conductive material, said helper being bent to bear against the wiper spring to urge it in the direction of the center of the elongated slot.

2. An electrical connector for a printed circuit board comprising an elongated dielectric block, an elongated slot in the top of said block disposed along the longitudinal axis thereof, a plurality of spaced compartment defining walls in the slot extending from each side thereof in the direction of the center of said slot, an opening in the block leading from each of the compartments to the bottom of said block, a contact member in each of the compartments extending downwardly through the openings and out of the bottom of the block, each of said contacts comprising a single length of conductive material doubled back upon itself at each end thereof, a somewhat hook shaped member formed in the doubled back portion at the top of the contact and extending into the compartment, a contact wiper spring formed of the free end of the upper portion of the contact disposed in the slot and extending in the direction of the center thereof, an elongated terminal member formed of the doubled back bottom portion of the conductive material, a bowed portion in each of the contact members between the hooked shaped member and the terminal member, and an upwardly disposed helper spring consisting of the free end of the bottom portion of the length of conductive material, said helper being bent to bear against the wiper spring to urge it in the direction of the center of the elongated slot.

3. An electrical connector according to claim 2 in which the block is formed with a longitudinal rib in the bottom of each compartment to receive the hooked shaped member of the contact and limit its movement in the direction of the center of the slot, and a small ridge in the bottom of the elongated slot to stop the inward travel of the wiper springs.

4. An electrical connector according to claim 2 in which the elongated terminal member is offset in the direction of the center of the slot above the openings and provided with an outwardly disposed ear beneath the block to lock the said contacts in place within the block.

5. An electrical connector according to claim 2 in which the elongated terminal member is offset in the direction of the center of the slot above the openings and provided with an outwardly disposed ear beneath the block and the contacting surfaces of the contact wiper springs are stiffened by spaced ribs, impressed therein.

References Cited in the file of this patent

UNITED STATES PATENTS

| | | |
|---|---|---|
| 2,882,511 | Mason | Apr. 14, 1959 |
| 2,908,775 | Gilbert | Oct. 13, 1959 |